US008874386B2

(12) United States Patent
Brusarosco et al.

(10) Patent No.: US 8,874,386 B2
(45) Date of Patent: Oct. 28, 2014

(54) METHOD AND SYSTEM FOR DETERMINING A TYRE LOAD DURING THE RUNNING OF A MOTOR VEHICLE

(75) Inventors: Massimo Brusarosco, Milan (IT); Federico Mancosu, Milan (IT); Daniele Arosio, Milan (IT)

(73) Assignee: Pirelli Pneumatici S.p.A., Milan (IT)

(*) Notice: Subject to any disclaimer, the term of this patent is extended or adjusted under 35 U.S.C. 154(b) by 848 days.

(21) Appl. No.: 13/052,627

(22) Filed: Mar. 21, 2011

(65) Prior Publication Data

US 2011/0231113 A1 Sep. 22, 2011

Related U.S. Application Data

(62) Division of application No. 10/563,370, filed as application No. PCT/EP03/07185 on Jul. 4, 2003, now Pat. No. 7,945,361.

(51) Int. Cl.
*B60C 23/06* (2006.01)
*G01G 19/02* (2006.01)
(Continued)

(52) U.S. Cl.
CPC ............... *B60C 23/064* (2013.01); *G06F 19/00* (2013.01); *G01B 21/12* (2013.01); *B60C 23/06* (2013.01)
(Continued)

(58) Field of Classification Search
CPC ........ B60C 23/00; B60C 23/02; B60C 23/06; B60C 23/064; B60C 23/066; B60C 23/067; G01B 5/00; G01B 5/0025; G01B 5/14; G01B 5/20; G01B 5/201; G01B 5/28; G01B 5/30; G01B 7/00; G01B 7/16; G01B 7/28; G01B 7/282; G01B 7/24; G01B 13/00; G01B 13/08; G01B 13/12; G01B 13/16; G01B 13/22; G01B 13/24; G01B 21/00; G01B 21/10; G01B 21/12; G01B 21/30; G01B 21/32; G01D 7/00; G01D 9/00; G01D 21/00; G01G 3/00; G01G 3/10; G01G 19/00; G01G 19/02; G01G 19/021; G01G 19/022; G01G 19/024; G01G 19/25; G01G 19/027; G01G 19/08; G01G 19/086; G01G 19/12; G01L 1/00; G01L 1/005; G01M 17/00; G01M 17/007; G01M 17/013; G01M 17/02; G06F 11/00; G06F 11/30; G06F 11/32; G06F 11/34; G06F 17/00; G06F 17/40; G06F 19/00
USPC ............... 73/146, 146.2, 146.3, 146.4, 146.5, 73/432.1, 865.8, 866.3; 340/425.5, 438, 340/442, 443, 444, 500, 540, 603, 626, 340/665; 701/1, 34.4, 124; 702/1, 33, 41, 702/127, 138, 140, 173, 174, 175, 187, 702/189; 708/100, 105, 200
See application file for complete search history.

(56) References Cited

U.S. PATENT DOCUMENTS 3,500,681 A * 3/1970 Shively ........................... 73/146
(Continued)

FOREIGN PATENT DOCUMENTS

DE 3916176 A1 * 11/1990
(Continued)

*Primary Examiner* — Edward Cosimano
(74) *Attorney, Agent, or Firm* — Finnegan, Henderson, Farabow, Garrett & Dunner, L.L.P.

(57) ABSTRACT

A method for determining a load exerted on a tire, fitted on a vehicle, during running of the vehicle on a rolling surface, is disclosed. The method includes acquiring a first signal comprising a first signal portion representative of a radial deformation; measuring an amplitude of the radial deformation in the first signal portion; estimating a rotation speed of the tire corresponding to the radial deformation; estimating an inflation pressure of the tire corresponding to the radial deformation; and deriving the load exerted on the tire from the amplitude, the rotation speed, and the inflation pressure. The first signal portion is representative of the radial deformation to which a first tread area portion of the tire is subjected during passage of the first tread area portion through a contact region between the tire and the rolling surface. A system for determining the load exerted on the tire is also disclosed.

28 Claims, 8 Drawing Sheets

(51) Int. Cl.
  *G01B 21/12*  (2006.01)
  *G06F 17/40*  (2006.01)
  *G06F 19/00*  (2011.01)

(52) U.S. Cl.
  CPC ...... (2013.01); *G01G 19/025* (2013.01); *G06F 17/40* (2013.01)
  USPC .................. 702/41; 73/146; 73/865.8; 701/1; 702/1; 702/127; 702/173; 702/189

(56) References Cited

U.S. PATENT DOCUMENTS

| | | | |
|---|---|---|---|
| 4,334,215 A * | 6/1982 | Frazier et al. | 340/447 |
| 4,966,034 A * | 10/1990 | Bock et al. | 73/146.5 |
| 5,230,243 A * | 7/1993 | Erich | 73/146.3 |
| 5,274,355 A * | 12/1993 | Galan | 340/445 |
| 5,297,424 A * | 3/1994 | Sackett | 73/146.5 |
| 5,513,525 A * | 5/1996 | Schurmann | 73/146.5 |
| 5,587,698 A * | 12/1996 | Genna | 340/442 |
| 5,591,906 A | 1/1997 | Okawa et al. | |
| 5,629,478 A * | 5/1997 | Nakajima et al. | 73/146.2 |
| 5,749,984 A | 5/1998 | Frey et al. | |
| 5,793,285 A | 8/1998 | Wehinger | |
| 6,218,936 B1 * | 4/2001 | Imao | 340/447 |
| 6,271,748 B1 * | 8/2001 | Derbyshire et al. | 340/442 |
| 6,518,875 B2 * | 2/2003 | DeZorzi | 340/442 |
| 6,538,566 B1 * | 3/2003 | Morand et al. | 340/444 |
| 6,539,295 B1 | 3/2003 | Katzen et al. | |
| 6,545,599 B2 * | 4/2003 | Derbyshire et al. | 340/442 |
| 6,561,018 B2 * | 5/2003 | Mancosu et al. | 73/146 |
| 6,722,193 B1 * | 4/2004 | Conway | 73/146.8 |
| 6,724,301 B2 | 4/2004 | Ginman et al. | |
| 6,725,713 B2 | 4/2004 | Adamson et al. | |
| 6,758,088 B2 | 7/2004 | Claussen et al. | |
| 6,779,392 B2 * | 8/2004 | Bell et al. | 73/146.8 |
| 6,823,728 B1 | 11/2004 | Barnes | |
| 6,882,270 B2 * | 4/2005 | Stewart et al. | 340/442 |
| 6,897,770 B2 | 5/2005 | Lill | |
| 6,952,160 B1 | 10/2005 | Bennie et al. | |
| 6,958,684 B2 | 10/2005 | Lin et al. | |
| 6,958,686 B2 * | 10/2005 | Okubo | 340/447 |
| 7,404,317 B2 * | 7/2008 | Mancosu et al. | 73/146 |
| 7,404,318 B2 * | 7/2008 | Merino-Lopez et al. | 73/146 |
| 7,546,764 B2 * | 6/2009 | Morinaga et al. | 73/146 |
| 7,918,131 B2 * | 4/2011 | Matsuda et al. | 73/146.5 |
| 7,945,361 B2 * | 5/2011 | Brusarosco et al. | 701/36 |
| 8,316,700 B2 * | 11/2012 | Brusarosco et al. | 73/146 |
| 2002/0044050 A1 * | 4/2002 | Derbyshire et al. | 340/442 |
| 2002/0075144 A1 * | 6/2002 | DeZorzi | 340/442 |
| 2002/0166373 A1 * | 11/2002 | Mancosu et al. | 73/146 |
| 2002/0196138 A1 | 12/2002 | Kogure et al. | |
| 2003/0010107 A1 | 1/2003 | Giustino et al. | |
| 2003/0010108 A1 | 1/2003 | Goslar et al. | |
| 2003/0058118 A1 | 3/2003 | Wilson | |
| 2003/0062994 A1 * | 4/2003 | Morand et al. | 340/443 |
| 2003/0070477 A1 | 4/2003 | Fischer et al. | |
| 2003/0080860 A1 * | 5/2003 | Stewart et al. | 340/442 |
| 2003/0121318 A1 * | 7/2003 | Bell et al. | 73/146.2 |
| 2003/0121319 A1 | 7/2003 | Kojima et al. | |
| 2004/0164855 A1 * | 8/2004 | Okubo | 340/445 |
| 2005/0085987 A1 | 4/2005 | Yokota et al. | |
| 2007/0010928 A1 * | 1/2007 | Brusarosco et al. | 701/70 |
| 2007/0205879 A1 * | 9/2007 | Matsuda et al. | 340/438 |
| 2007/0240501 A1 * | 10/2007 | Mancosu et al. | 73/146 |
| 2007/0240502 A1 * | 10/2007 | Morinaga et al. | 73/146 |
| 2008/0016955 A1 * | 1/2008 | Merino-Lopez et al. | 73/146 |
| 2009/0184814 A1 * | 7/2009 | Lee et al. | 340/447 |
| 2010/0126263 A1 * | 5/2010 | Brusarosco et al. | 73/146 |
| 2011/0257902 A1 * | 10/2011 | Melzi et al. | 702/34 |
| 2014/0005956 A1 * | 1/2014 | Patel et al. | 702/41 |

FOREIGN PATENT DOCUMENTS

| | | |
|---|---|---|
| DE | 4009540 A1 | 9/1991 |
| DE | 4228894 A1 | 3/1994 |
| DE | 196 11 364 A1 | 10/1997 |
| DE | 198 07 880 A1 | 9/1999 |
| DE | 199 17 034 C1 | 11/2000 |
| DE | 100 58 099 A1 | 5/2002 |
| EP | 0 719 663 A1 | 7/1996 |
| EP | 0 887 211 A1 | 12/1998 |
| EP | 887221 A1 * | 12/1998 |
| EP | 1293362 A2 * | 2/2003 |
| EP | 1 293 362 A2 | 3/2003 |
| JP | 03 135810 A | 6/1991 |
| JP | 06 115328 A | 4/1994 |
| JP | 9-2031 A * | 1/1997 |
| WO | WO 03/016115 A1 * | 2/2003 |
| WO | WO 2005/005950 A1 * | 1/2005 |

* cited by examiner

US 8,874,386 B2

METHOD AND SYSTEM FOR DETERMINING A TYRE LOAD DURING THE RUNNING OF A MOTOR VEHICLE

CROSS-REFERENCED TO RELATED APPLICATIONS

This application is a divisional of U.S. application Ser. No. 10/563,370, filed May 26, 2006 now U.S. Pat. No. 7,945,361, which is a national phase entry under 35 U.S.C. §371 from PCT International Application No. PCT/EP2003/007185, filed Jul. 4, 2003, in the European Patent Office, the contents of which are relied upon and incorporated herein by reference.

BACKGROUND

1. Field of the Disclosure

The present invention relates to a method and a system for determining a vertical load to which a tyre mounted on a vehicle is subjected, during running of the vehicle.

Inflation pressure is a convenient measurement to make on a tyre fitted on a vehicle wheel and it is becoming a standard by which tyres are monitored. Tyre load, i.e., the supported weight, is a more difficult measurement but, unlike pressure, is a direct measurement of tyre stress. Tyres are selected for a particular vehicle based on the physical strength of their structure and/or material, as well as on the normal range of vehicle weight that they should support at specified nominal temperature and pressure. If the vehicle applies a load to a tyre in excess of the load range for which the tyre has been designed, the tyre is subjected to excessive stress and may fail or have its expected lifetime shortened.

Furthermore, it has to be considered that tyre maintenance is mainly based on the duty, by the vehicle driver, of maintaining tyre pressure near a nominal value, defined by the vehicle and tyre manufacturers. Although it is well known by the tyre industry that the requisite pressure is dependent on the supported load, this load-dependent pressure information is not provided to the driver, since real-time load is unknown. As a result, should the load vary from that assumed by the manufacturer, the tyres may be improperly inflated. Since the requisite pressure increases with load, the only option left is to assume the maximum load and specify a pressure accordingly. However, this maximum pressure can: 1) give a very hard ride; 2) reduce the tyre-to-road contact area available for braking; 3) wear out the center of the tyre tread prematurely. Thus, tyre load information is needed to properly inflate tyres.

Moreover, vehicle electronic control systems, such as for example a vehicle brake control system, a traction control system, an anti-lock braking system, an electronic braking system, a steering control system, an active roll control system, a vehicle stability control system, may use information related to the tyre load, in order to control actuators that move, control and stop the vehicle.

This tyre information may be used within the vehicle, or it can be used remotely, i.e. outside the vehicle. As the telematic capability of vehicles increases, they are capable of wirelessly communicating with a remote facility for monitoring the vehicle health (diagnostics), for prediction of maintenance (prognostics), and to monitor the vehicle as it passes on the road. The information may be also historically important to understand the cause of accidents.

2. Description of Related Art

U.S. Pat. No. 5,793,285 discloses a method and apparatus for monitoring tyres on a vehicle, by continuously measuring the distance between the associated vehicle axle (or a vehicle body part rigidly connected thereto) and the road, while the vehicle is in operation. From this measurement, the tyre deflection is determined. According to the authors, the measured tyre deflection represents a comparatively exact measure of the respective tyre load. When the tyre deflection determined leaves a predetermined desired range, a warning signal is transmitted.

PCT patent application no. WO 03/016115 discloses a method for determining the charge or load exerted on a tyre of a motor vehicle and/or for monitoring tyre pressure, wherein the pressure in each tyre is detected during operation of the vehicle and the rotational behavior of the individual wheels is observed. Load distribution parameters are also determined by comparing the rotational behavior and/or changes in said rotational behavior of the individual wheels during given driving states, taking into account preset and/or predetermined and/or learned variables. Tyre pressure and load distribution parameters are used to determine the load or charge exerted on the tyres and/or pressure loss. In one example, a pressure-measuring system based on the use of pressure sensors (such as TPMS=Tyre Pressure Measuring System), is used to determine the tyre pressure, whilst characteristic variables representing the load distribution are determined using a system based on an evaluation of wheel speed data operating in the manner of a system (Deflation Detecting System=DDS) used to determine conditions relating to the dynamic rolling circumferences of the individual tyres. Consequently, the function of detecting capacity utilization can be set up using existing systems. In another example, the number of revolutions of a front wheel is compared with the number of revolutions of a rear wheel at the same vehicle speed or at approximately the same vehicle speed (e.g. vehicle reference speed), evaluated to obtain a load distribution characteristic variable, and the value and/or the change in the load distribution characteristic variables in defined driving situations is/are used as a means of calculating the capacity utilization or load of the tyres and/or the pressure loss.

US patent application no. 2003/0058118 discloses a vehicle and vehicle tyre monitoring system, apparatus and method for determining the load-induced deflection or deformation of a vehicle tyre. Based thereon, deflection-related information, such as tyre load, molar air content, total vehicle mass and distribution of vehicle mass, are provided. The tyre deflection region or contact region of the loaded tyre is detected by sensing the acceleration of the rotating tyre by means of an accelerometer mounted on the tyre, preferably on an inner surface such as the tread lining thereof. As the tyre rotates and the accelerometer is off of the contact region, a high centrifugal acceleration is sensed. Conversely, when the accelerometer is on the contact region and not rotating, a low acceleration is sensed. The deflection points delimiting the contact region are determined at the points where the sensed acceleration transitions between the high and low values. From a measurement of the rotation rate of the tyre, of the time between detections of the deflection points and from the tyre radius, the contact length (contactLength) can be determined. In order to determine the tyre load, the following formula is suggested:

$$\text{load} = \alpha \times \text{treadWidth} \times \text{contactLength} \times \text{pressure} + \text{forceSidewall}$$

where treadWidth is the width of the tread, treadWidth×contactLength is the area of applied pressure, forceSidewall is the effective resiliency of the tyre sidewall to collapse, and $\alpha$ is a proportionality constant near to 1. Alternatively, the load can be determined from a disclosed relationship between air moles, pressure, temperature and contact length, derived from the Ideal Gas Law.

According to the Applicant, the methods disclosed in the above U.S. Pat. No. 5,793,285 and in the above PCT patent application no. WO 03/016115 may not give reliable real-time determinations of the tyre load, since they are not based on measurements performed directly on the tyre. Thus, they may suffer from an "averaging effect", which can cause a loss of important tyre load data, especially in rapidly varying conditions.

On the other hand, the approach disclosed in the above US patent application no. 2003/0058118 is quite theoretical and could not fit with a complex system such as a tyre. For example, considering the rectangle treadWidth×contactLength as the area of applied pressure is a strong approximation, as the contact area between the tyre tread and the road is quite different from a rectangle. Furthermore, the value forceSidewall is generally not determined with high precision, so that a further approximation would be included in the tyre load determination.

The Applicant has faced the problem of determining in real-time, i.e. during the running of the vehicle, and in a reliable way, the load to which a tyre fitted on the vehicle is subjected.

The Applicant has found that such problem can be solved by measuring the amplitude of the deformation in radial direction to which a portion of the tread area of the tyre is subjected when such portion passes in correspondence of the contact region between the tyre and the road, and by relating such amplitude to the rotation speed and to the inflation pressure of the tyre. Hereinafter, the deformation in radial direction will be referred as "radial deformation". Such radial deformation can be detected, for example, by means of a radial accelerometer secured to the inner liner of the tyre.

SUMMARY

In a first aspect, the invention relates to a method for determining a load exerted on a tyre fitted on a vehicle during a running of said vehicle on a rolling surface, the method comprising the following steps:

acquiring a first signal comprising a first portion representative of a radial deformation to which a first tread area portion of said tyre is subjected during passage of said first tread area portion in a contact region between said tyre and said rolling surface;

measuring an amplitude of said radial deformation in said first signal portion;

estimating a rotation speed and an inflation pressure of said tyre corresponding to said radial deformation;

deriving said tyre load from said amplitude, said rotation speed and said inflation pressure.

Said first signal may comprise a radial acceleration signal. Said step of measuring said amplitude can be performed by measuring a difference between a maximum value of said first signal and a minimum value of said first signal in said first signal portion.

For the purposes of the present invention, the expression "estimating a rotation speed and an inflation pressure of said tyre corresponding to said radial deformation" may include either a measurement from which the tyre inflation pressure value and/or the rotation speed value in the time interval in which the radial deformation of the first tread portion occurred can be inferred (even if such measurement is performed in a subsequent time interval), or a measurement of the tyre inflation pressure value and/or of the rotation speed value performed in real time, i.e. during the occurrence of the radial deformation of the first tread area portion.

The method may further comprise, before said step of measuring said amplitude, a further step of low-pass filtering said first signal.

Said step of estimating said rotation speed of the tyre may comprise measuring an average value of said first signal in a second signal portion, outside from said first signal portion.

Alternatively, said step of estimating said rotation speed of the tyre may comprise measuring an average value of said first signal in a whole turn of said tyre.

In a preferred embodiment, the method further comprises a step of acquiring a second signal representative of a radial acceleration to which a second tread area portion of said tyre is subjected. In such preferred embodiment, said step of estimating said rotation speed of the tyre may comprise measuring a value of said second signal during said passage of said first tread area portion in said contact region between said tyre and a rolling surface.

The method may further comprise, before said step of measuring said amplitude, a further step of sampling said first signal at a frequency of at least 5 kHz, preferably of at least 7 kHz.

The method may further comprise a step of providing characteristic functions describing an expected radial deformation amplitude versus rotation speed, corresponding to predetermined conditions of tyre load and inflation pressure. Said characteristic functions may comprise polynomial functions.

Preferably, said step of deriving said tyre load may comprise:
identifying a set of characteristic functions corresponding to said estimated inflation pressure;
determining, from said set of characteristic functions, a corresponding set of expected radial deformation amplitudes corresponding to said estimated rotation speed.

More preferably, said step of deriving said tyre load may further comprise:
comparing said measured radial deformation amplitude with any one of said set of expected radial deformation amplitudes, in order to identify a closer expected radial deformation amplitude;
determining said tyre load based from said closer expected radial deformation amplitude.

In a second aspect, the invention relates to a method of controlling a vehicle having at least one tyre fitted thereon, comprising:
determining a load exerted on said tyre by a method according to the first aspect;
passing said determined load to a vehicle control system of the vehicle;
adjusting at least one parameter in said vehicle control system based on said determined load.

The vehicle control system may comprise a brake control system, and said step of adjusting at least one parameter may comprise adjusting a braking force on said tyre.

Alternatively or in combination, the vehicle control system may comprise a steering control system, and said step of adjusting at least one parameter may comprise selecting a maximum variation allowed from steering commands.

Alternatively or in combination, the vehicle control system may comprise a suspension control system, and said step of adjusting at least one parameter may comprise adjusting a stiffness of a suspension spring associated to said tyre.

Typically, the vehicle comprises at least one tyre fitted on its right and at least one tyre fitted on its left. Alternatively to or in combination with the previous embodiments, the vehicle control system may comprise an active roll control system, and said step of adjusting at least one parameter comprises compensating an unequal load distribution between said left fitted tyre and said right fitted tyre.

In a third aspect, the invention relates to a system for determining a load exerted on a tyre fitted on a vehicle during a running of said vehicle on a rolling surface, the system comprising:

a measuring device adapted to acquire a signal representative of a deformation to which a first tread area portion of said tyre is subjected during passage of said first tread area portion in a contact region between said tyre and said rolling surface;
  a pressure sensor adapted to sense an inflation pressure of said tyre;
  a device for estimating a rotation speed of said tyre;
  at least one processing unit being adapted to determine an amplitude of said radial deformation in said first signal portion, and to derive said tyre load from said amplitude, said rotation speed and said inflation pressure.

In a preferred embodiment, said measuring device comprises a radial accelerometer.

The device for estimating the rotation speed of said tyre may be the same processing unit.

The system of the invention may further comprise a filtering device adapted for low-pass filtering said signal.

The measuring device may further comprise a sampling device adapted to sample said signal at a frequency of at least 5 kHz, preferably of at least 7 kHz.

At least one memory can be associated to said processing unit. Said at least one memory may comprise pre-stored characteristic functions describing an expected radial deformation amplitude versus rotation speed, corresponding to pre-determined conditions of tyre load and inflation pressure. Said functions may comprise polynomial functions.

Said at least one memory may further comprise pre-stored instructions for said processing unit. Said pre-stored instructions may comprise at least a first set of instructions being adapted to:

identify a set of characteristic functions corresponding to a sensed inflation pressure;
  determine, from said set of characteristic functions, a corresponding set of expected radial deformation amplitudes corresponding to said estimated rotation speed.

Said pre-stored instructions may further comprise at least a second set of instructions being adapted to:

compare said determined radial deformation amplitude with any one of said set of expected radial deformation amplitudes, in order to identify a closer expected radial deformation amplitude;
  determine said tyre load based from said closer expected radial deformation amplitude.

Said measuring device may be included in a sensor device located in a tread area portion of said tyre. Preferably, said sensor device may be disposed substantially in correspondence of an equatorial plane of the tyre.

Preferably, said sensor device may be secured to an inner liner of the tyre. In this embodiment, a damping element may be interposed between said sensor and said inner liner.

The sensor may further comprise a power source. Said power source may comprise a battery or, preferably, a self-powering device, being adapted to generate electrical power as a result of mechanical stresses undergone by said sensor device during running of said vehicle. Said self-powering device may, for example, comprise a piezoelectric element.

Furthermore, said self-powering device may comprise an electrical storage circuit, typically comprising a resistor and a capacitor.

Preferably, the processing unit is included within said sensor device.

Typically, the sensor device further includes a transmitting device. Said transmitting device may be operatively connected to a first antenna.

The system according to the invention may further comprise a fixed unit located on the vehicle, comprising a receiving device for receiving data from said sensor device. Said receiving unit typically comprises a second antenna.

Said first antenna and said second antenna are typically adapted for data transmission at a frequency comprised between 400 and 450 MHz.

BRIEF DESCRIPTION OF THE DRAWINGS

Further features and advantages of the present invention will be better illustrated by the following detailed description, herein given with reference to the enclosed drawings, in which.

DETAILED DESCRIPTION OF EXEMPLARY EMBODIMENTS

Figure 1:
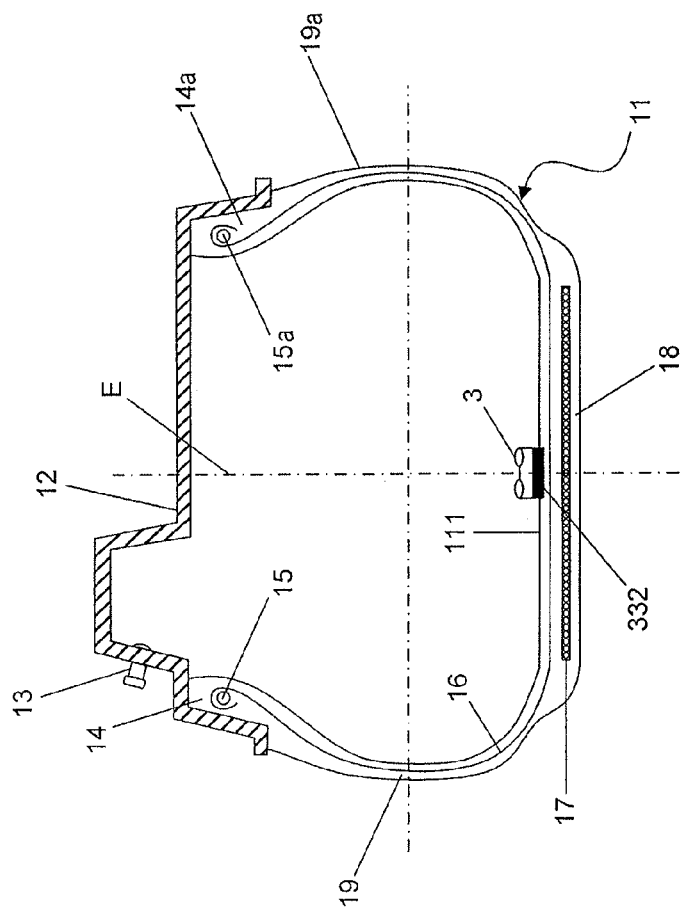
FIG. 1 shows a cross section of a tyre according to the invention, including a sensor device.

FIG. 1 shows a cross section of a wheel comprising a tyre 11 and a supporting rim 12. The tyre 11 shown in FIG. 1 is of a type conventionally known as "tubeless", i.e. it does not include an inner tube. This tyre can be inflated by means of an inflation valve 13 positioned, for example, on the channel of the said rim 12.

The tyre 11 includes a carcass 16, terminating in two beads 14 and 14*a*, each formed along an inner circumferential edge of the carcass 16, for fixing the tyre 11 to the corresponding supporting rim 12. The beads 14, 14*a*, comprise respective reinforcing annular cores 15 and 15*a*, known as bead cores. The carcass 16 is formed by at least one reinforcing ply, including textile or metallic cords, extending axially from one bead 14 to the other 14*a* in a toroidal profile, and having its ends associated with a respective bead core 15 and 15*a*. In tyres of the type known as radial, the aforesaid cords lie essentially in planes containing the axis of rotation of the tyre. An annular structure 17, known as belt structure, is placed in a radially external position with respect to the carcass 16. Typically, the belt structure 17 includes one or more strips of elastomeric material incorporating metal and/or textile cords, overlapping with each other. A tread band 18 of elastomeric material is wound around the belt structure 17 and impressed with a relief pattern for the rolling contact of the tyre with the ground. Two sidewalls 19 and 19a of elastomeric material, each extending radially outwards from the outer edge of the corresponding bead 14 and 14a, are also placed on the carcass 16 in axially opposed lateral positions. In tubeless tyres the inner surface of the carcass 16 is normally covered with a liner 111, i.e. with one or more layers of air-impermeable elastomeric material. Other known elements, such as for example bead fillers may be provided, according to the specific design of the tyre 11.

A sensor device 3, that will be described in detail in the remainder of the description, is included within the tyre 11. The sensor device 3 is located in a portion of the tread area of the tyre 11, i.e. the region of the tyre 11 axially extended between the sidewalls of the tyre 11. Preferably, the sensor device is disposed substantially in correspondence of the equatorial plane of the tyre 11. In the preferred embodiment shown in FIG. 1, the sensor device 3 is secured to the inner liner 111 of the tyre 11. A fixing element 332 adheres both to the sensor device 3 and to the inner liner 111. Suitable materials for the fixing element 332 may include generally flexible rubbers, such as for example natural rubber, or synthetic rubber, e.g. rubbers made from conjugated dienes having from 4 to 10 carbon atoms such as poly-isoprene, polybutadiene, styrene-butadiene rubber and the like. In preferred embodiments, a material included in the fixing element 332 should have a damping effect, in order to secure the fixing of the sensor device 3 to the inner surface of the tyre by minimizing the mechanical stresses exerted onto the fixing surface during use of the tyre 11. Furthermore, a damping material reduces the probability of damages to the sensor device 3 by preventing transmission of the above stresses to the device. Suitable damping materials may have a Shore A hardness (measured at 23° C. according to ASTM Standard D2240) of from about 1 to about 40, and an elastic rebound (measured at 23° C. according to ASTM Standard D1054) lower than about 60. Cross-linked diene elastomers or polyurethane gel materials may be adapted in order to fit with these damping specifications. For improved adhesion between the sensor device 3 and the tyre 11, it may be advantageous to interpose a further adhesive element, for example a double-sided adhesive film, between the fixing element 332 and the inner surface of the tyre 11 and/or between the fixing element 332 and the sensor device 3. An appropriate double-sided adhesive film may be the SCOTCH® 300SL HI Strength, marketed by 3M. In alternative embodiments, the sensor device 3 may be incorporated within the structure of the tyre in the tread area, for example within the tread band, or between the outer belt strip and the tread band.

In a preferred embodiment of the present invention (not shown), a plurality of sensor devices are associated to a tyre 11. More particularly, the sensor devices may be located in a circumferential position spaced one from each other of substantially the same angle. For example, three sensor devices may be located within the tyre, circumferentially spaced from each other of an angle of substantially 120°. As far as the securing of the plurality of the sensor devices to the tyre 11, reference is made to what said above.

As it will be clarified in the following, the use of a plurality of sensor devices allows to achieve more accuracy and reliability of the measurements performed, as well as a better monitoring of the tyre load during the entire wheel turn.

The sensor device 3 is adapted to communicate with a unit external to the tyre 11. Such external unit will be referred in the following as "fixed" unit. Typically, the fixed unit may be located on the vehicle on which the tyre 11 is fitted. Alternatively or in combination with a fixed unit located on the vehicle, a fixed unit may be a hand-held unit usable by an operator, or a unit located along a roadway (e.g. in a service station).

Figure 2:
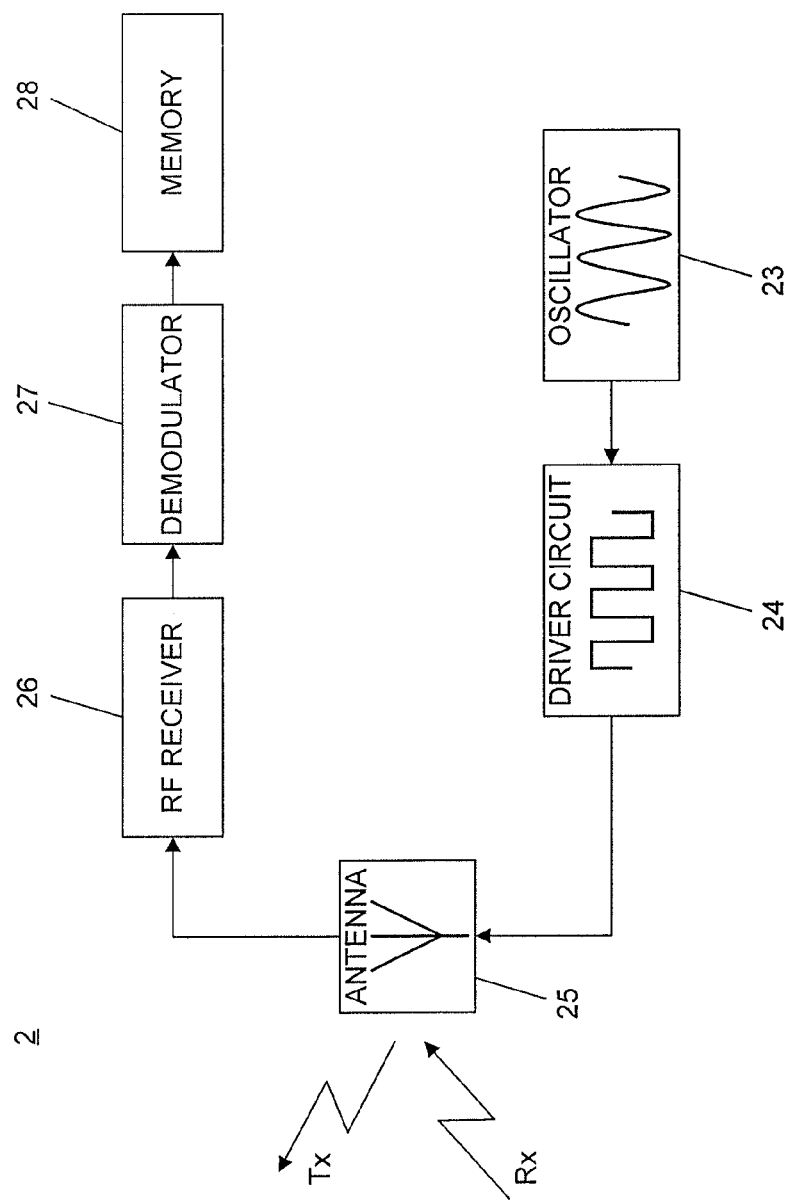
FIG. 2 shows a diagram of a fixed unit included in a system according to the invention.

For example, FIG. 2 shows a block diagram of a fixed unit 2, comprising a device for receiving from the sensor device 3 included within the tyre 11. Preferably, the fixed unit 2 also comprises a device for transmitting to said sensor device 3. The receiving device may comprise a radio-frequency receiver 26 connected to a first antenna 25, referred to below as the "fixed antenna". Preferably, the receiving device also comprises an electrical demodulator device 27. A memory 28, such as for example an EPROM, can store the data received by the sensor device 3 and demodulated by the demodulator 27. In preferred embodiments, the memory 28 is associated to a central processing unit (CPU, not shown in FIG. 2), in order to perform calculations from the data received by the sensor device 3 and/or stored in the memory 28. The memory 28 may also store historical logs of excessive tyre loads, pressure and/or temperatures, possibly in combination with logs of the steps taken by a vehicle control system in order to control the vehicle behavior and/or of alarm messages displayed to the driver of the vehicle. The transmission device preferably comprises an oscillator circuit 23, which supplies a driver circuit 24 for the fixed antenna 25. If the fixed unit 2 is located on the vehicle, the electrical energy required to power the fixed unit 2 can be supplied directly by the vehicle battery.

Figure 3:
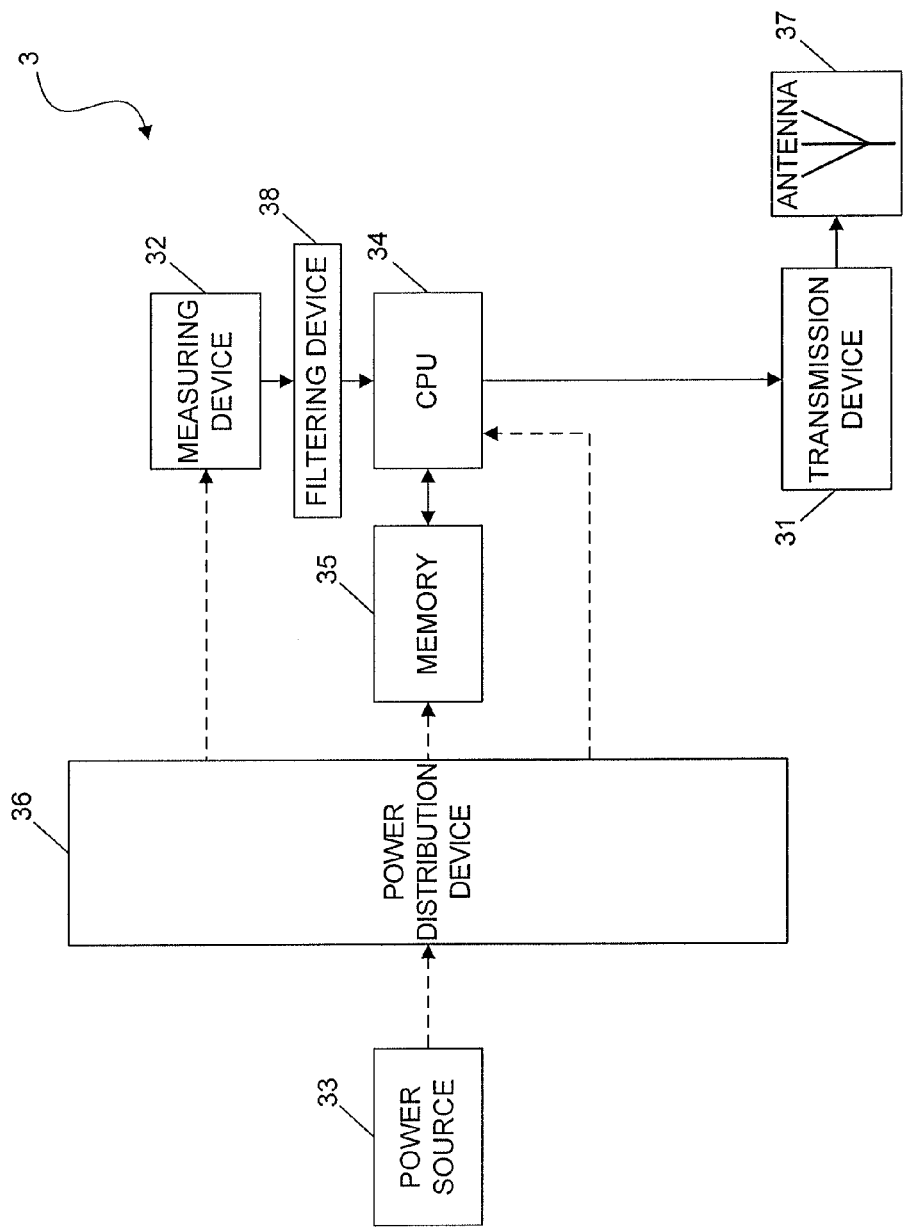
FIG. 3 shows a diagram of a sensor device included in a tyre according to the invention.

The sensor device 3, an exemplary block diagram of which is shown in FIG. 3, comprises in general terms a device 31 for data transmission to the said fixed unit and a measuring device 32 adapted to measure a radial deformation of the tread area portion of the tyre 11 to which the sensor device 3 is associated. The measuring device 32 may preferably comprise a radial accelerometer. Such radial accelerometer should be capable of support and correctly measure very high acceleration values, as the radial acceleration supported by the tread area of the tyre may reach, at high speed, values of 500-1000 g, wherein g is the gravity acceleration. In an alternative embodiment, the measuring device may comprise an extensometer, whose output signal gives a measure of the flexion of the monitored tread area portion. The load to which the tyre is subjected is determined by measuring the amplitude of the radial deformation to which the tread area portion corresponding to the position of the sensor device 3 is subjected. For the purposes of the present invention, the expression "radial deformation" may comprise either the actual tyre deflection (for example measured in mm, or as a ratio to the tyre radius) to which the monitored tread area portion is subjected, or the radial acceleration to which the monitored tread area portion is subjected. In order to perform a real-time determination of the tyre load, the radial deformation should be detected with high precision, preferably at any turn of the tyre. For this purpose, and taking into account the frequency rotation of a rolling tyre (particularly at high speed), the measuring device 32 preferably includes a sampling device (not shown) capable of enabling the reading of the sensed radial deformation signal at a frequency of at least 5 kHz, more preferably at a frequency of at least 7 kHz, so as to furnish a sampled signal thereof. In preferred embodiments, the measuring device 32 may also include a pressure sensor and/or a temperature sensor. However, pressure and temperature measurements do not need a high frequency sampling: a single measure per tyre turn may be sufficient. In alternative embodiments, a pressure and/or a temperature sensor may also be disposed externally of the sensor device 3, e.g. located within the tyre valve. The sensor device 3 typically includes also an antenna 37, referred to below as the "mobile antenna", operatively connected to said transmission device 31, for data transmission to the fixed antenna of the fixed unit. Transmission from the mobile antenna to the fixed antenna may occur at conventional telemetry radio-frequencies, e.g. in a band comprised between 400 and 450 MHz (for example at 418 MHz or 433 MHz).

The sensor device 3 may further include a processing unit (CPU) 34, associated to a memory device 35. The memory device 35 may contain re-writable memory locations in which information about the measurements taken by the measuring device 32 can be stored. Furthermore, it may also contain pre-stored instructions for the processing unit 34, suitable for pre-processing the signals coming from the measuring unit 32 before transmission, in order to reduce the quantity of information sent out of the tyre 11. More particularly, the deformation signal may be pre-processed in order to detect characteristic points, such as for example maxima and minima, the coordinates of which can be sent to the transmission device 31 for transmission to the fixed unit. This allows to save transmission bandwidth and required power for transmission. Furthermore, a filtering device 38 may be interposed between the measuring unit 32 and the processing unit 34, in order to low-pass filter the deformation signal and discriminate the useful signal from high-frequency noise caused by the interaction between the tread band and the road. However, such filtering may be provided by electronics included within the measuring device 32 or as further pre-processing instruction stored within the memory 35.

A power source 33 allows to energize the sensor device 3. The sensor device 3 may be powered by a battery. However, for a real-time determination of the tyre load a great electrical power consumption may be requested by the measuring device 32 (in particular by a high frequency sampling device), by the processing unit 34 and by the transmission device 31, so that a battery could have short lifetime, as compared to the entire life of the tyre. Thus, in preferred embodiments the power source 33 includes a self-powering device, which generates electricity as a result of the mechanical stresses to which said self-powering device is subjected (for example, centrifugal force, or the deformations of the liner, or movements due to traveling on uneven roads). As an example, piezoelectric materials may be used in the self-powering device for such purpose. The self-powering device also includes an electrical energy storage circuit (not shown), typically including a resistor and a capacitor. As a further alternative, the sensor device 3 may be energized by the fixed unit by means of a suitable receiving device (not shown), connected to the mobile antenna 37.

A device for distributing the electrical power 36 preferably distributes appropriately the electrical power provided by the power source 33 to said processing unit 34, to said memory device 35, to said transmitting device 31 and to said measuring device 32, according to their requirements.

It has to be noticed that it is not necessary to include the measuring device, the transmission portion to the fixed unit and the control electronics within a single packaged sensor device. For example, the control electronics and the transmission portion to the fixed unit could be packaged in a separated device secured to other parts of the tyre or of the wheel (e.g. the rim, or the sidewall), associated by a wired or wireless (e.g. optical or by radio-frequency) connection to a measuring device located in the tread area portion of the tyre.

Figure 4:
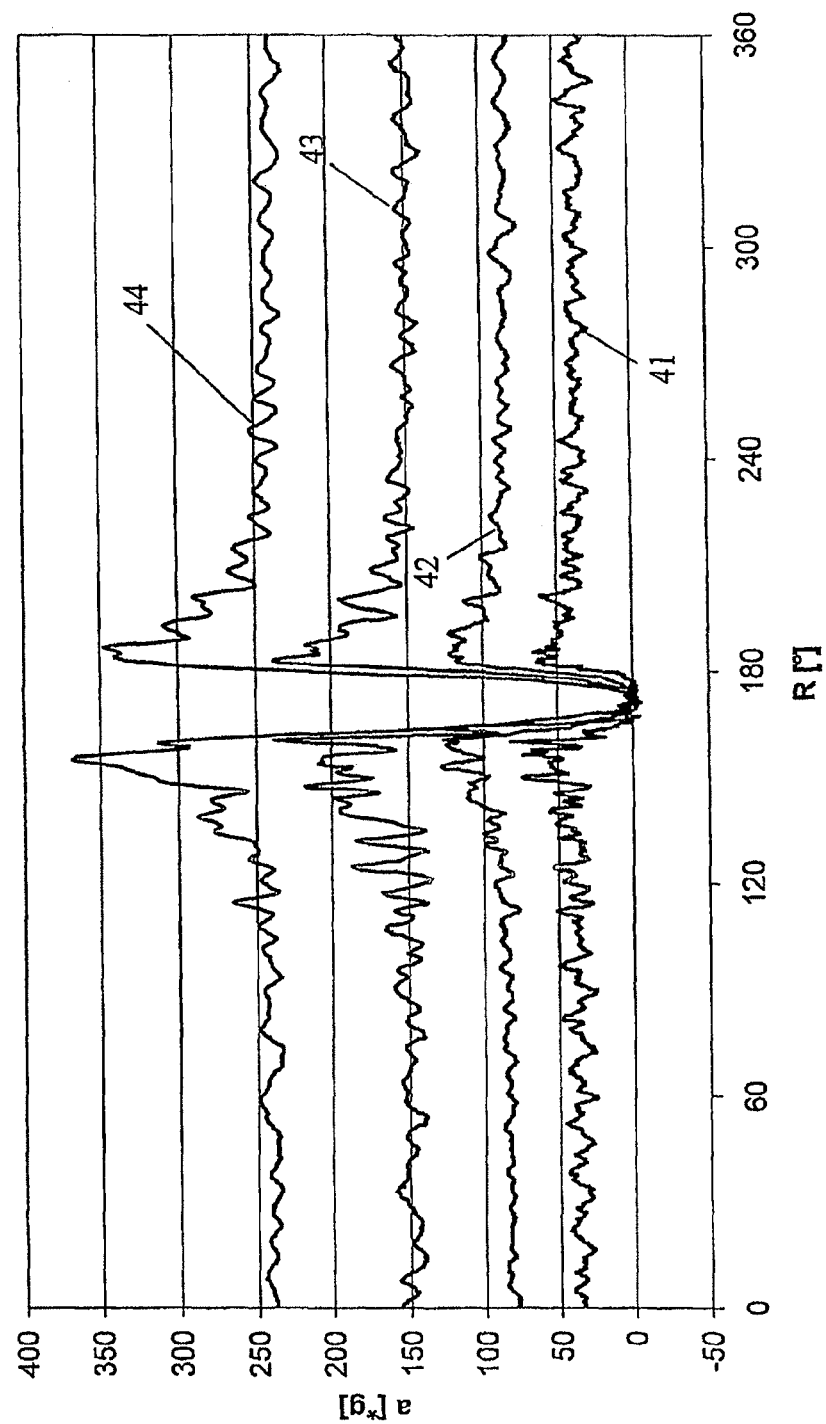
FIG. 4 shows a series of radial acceleration curves obtained at different tyre rotation speeds.

FIG. 4 shows, by way of example, the result of a series of measurements performed by the Applicant by securing a radial accelerometer to the inner liner of a tyre model PIRELLI® P6000® 195/65 R15, inflated at a pressure of 2.2 bar, with a load of 3500 N. A rolling of the tyre was caused at different speeds and the radial acceleration signal detected by the accelerometer was correspondingly plotted. In FIG. 4, the rotation angle R for a single turn around the tyre axis of the tread area portion corresponding to the accelerometer position is reported in abscissa. The angle ranges from 0° to 360°, these two extremes corresponding substantially to a radially opposite position with respect to the contact region between the tyre and the road (hereinafter contact patch). On the contrary, the position around 180° corresponds to the passage of the crown portion monitored by the accelerometer under the contact patch. The radial acceleration a sensed by the accelerometer is reported in ordinate, as a multiple of g. Curve 41 refers to a traveling speed of 40 km/h, curve 42 refers to a traveling speed of 60 km/h, curve 43 refers to a traveling speed of 80 km/h, curve 44 refers to a traveling speed of 100 km/h. As it can be seen, in correspondence to the passage under the contact patch the level of radial centrifugal acceleration sensed by the accelerometer increases abruptly a first time, then drops to until substantially zero, and then increases abruptly a second time. In other positions the radial acceleration sensed by the accelerometer has an average level related to the rotation speed of the rolling tyre: the higher the speed, the higher the sensed acceleration. The curves of FIG. 4 show that when the tread area portion corresponding to the position of the accelerometer begins and ends its passage under the contact patch, such tread area portion is subjected to a strong radial deformation (corresponding to the peaks shown by the curves), whereas in other positions such tread area portion is not practically subjected to deformations (corresponding to the substantially zero acceleration value within the contact patch and to the substantially constant acceleration value outside from the contact patch).

By analyzing radial acceleration curves in different conditions of rotation speed, load and inflation pressure, the Applicant has observed that:

a) the amplitude of the peaks representing the radial deformation of the tread area portion increases with increasing rotation speed of the tyre (i.e., the higher the speed, the higher the peaks);

b) at constant speed, the amplitude of the peaks representing the radial deformation of the tread area portion increases with increasing tyre load (i.e., the higher the load, the higher the peaks);

c) at constant speed, the amplitude of the peaks representing the radial deformation of the tread area portion decreases with increasing tyre inflation pressure (i.e., the higher the pressure, the lower the peaks).

Figure 5A:
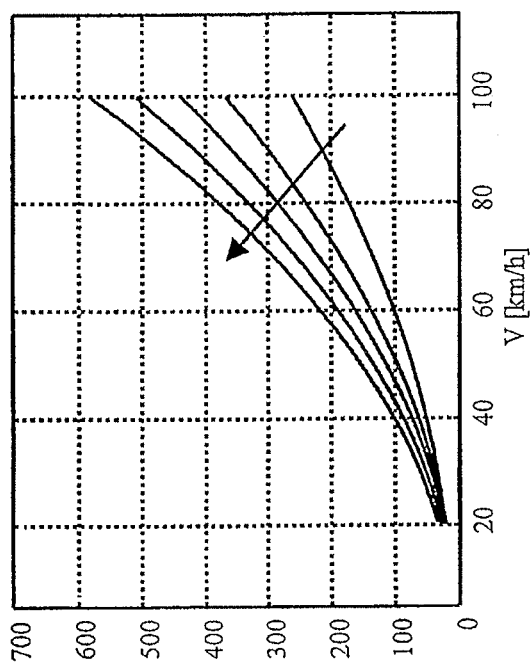
FIGS. 5*a* and 5*b* exemplarily disclose two sets of curves of radial deformation peak amplitude versus tyre rotation speed, corresponding to different tyre loads, respectively for a first and second value of tyre inflation pressure.
Figure 5B:
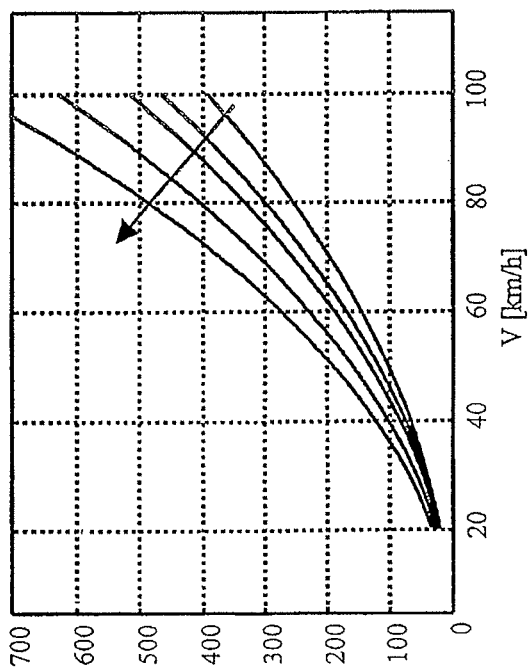

Summarizing the above results, the Applicant has plotted different curves of radial deformation (peak) amplitude versus rotation speed, corresponding to different tyre loads, on the same graph, at constant inflation pressure. FIGS. 5a, 5b show two of such plots, carrying curves of peak amplitude versus tyre rotation speed increasing tyre loads (the arrow shown in the figures refers to increasing tyre loads). FIGS. 5a,5b relate to an inflation pressure of 1.6 bar (FIG. 5a) and 2.2 bar (FIG. 5b). As each curve represents a predetermined tyre load value, by knowing the rotation speed and the inflation pressure, and by measuring the radial deformation peak amplitude value, a unique curve representing a tyre load value can be identified in the graph, i.e. the tyre load can be estimated.

On the other hand, since $a_{radial}=V^2/R$ or $a_{radial}=\omega^2 R$ (wherein R is the radius of the tyre), the average level of acceleration to which the tread area portion corresponding to the position of the radial accelerometer is subjected outside the contact patch increases with increasing rotation speed, substantially without any dependency on the tyre load and inflation pressure. This means that the rotation speed of the tyre can be derived by measuring the average radial acceleration level in the portion of the radial acceleration signal corresponding to the outside of the contact patch, for any tyre load and inflation pressure. Thus, advantageously, a signal furnished by a radial accelerometer disposed in a tread area portion of the tyre can give two of the parameters needed for estimating the tyre load, i.e. the amplitude of the radial deformation peak and the rotation speed. The third parameter, i.e. the inflation pressure, can be provided by a conventional pressure sensor. However, it has to be noticed that also the tyre rotation speed may be provided by a separate device, such as for example by a measurement performed in other parts of the vehicle, different from the tyre (e.g., the wheel hub).

In a preferred method for determining the tyre load, each of the curves shown in FIGS. 5a, 5b can be described by a fit function, such as for example a polynomial fit function. For example, the curves obtained at a pressure p and at different tyre loads q1, q2, ... qn can be described by parabolic fit functions:

$$y\_1 = a1_{q1,p}\omega^2 + b1_{q1,p}\omega + c1_{q1,p} \quad [1]$$

$$y\_2 = a2_{q2,p}\omega^2 + b2_{q2,p}\omega + c2_{q2,p}$$

...

...

$$y\_n = an_{qn,p}\omega^2 + bn_{qn,p}\omega + cn_{q2,p}$$

The values $y\_1(q,p,\omega), \ldots, y\_n(q,p,\omega)$ calculated with equations [1] represent expected radial deformation peak values, at given conditions of tyre load, pressure and rotation speed.

In an initial step of characterization of a tyre, graphs similar to those shown in FIGS. 5a and 5b can be plotted for the tyre at predetermined inflation pressure values p1, p2 ... pn, predetermined tyre loads q1, q2, ... qn, and predetermined rotation speeds, in order to find the sets of fit coefficients for the above values of inflation pressure, i.e.

pressure $p1$: $(a1_{q1,p1}, b1_{q1,p1}, c1_{q1,p1}), \ldots, (an_{qn,p1}, bn_{qn,p1}, cn_{qn,p1})$ [2]

pressure $p2$: $(a1_{q1,p2}, b1_{q1,p2}, c1_{q1,p2}), \ldots, (an_{qn,p2}, bn_{qn,p2}, cn_{qn,p2})$

...

...

pressure $pn$: $(a1_{q1,pn}, b1_{q1,pn}, c1_{q1,pn}), \ldots, (an_{qn,pn}, bn_{qn,pn}, cn_{qn,pn})$ The fit coefficients [2], as well as the pressure values to which they are related, can be stored within the memory included within the sensor device 3 located in the tread area of the tyre. The above described characterization of the tyre can be performed once per tyre model, for example in indoor tests.

Figure 6A:
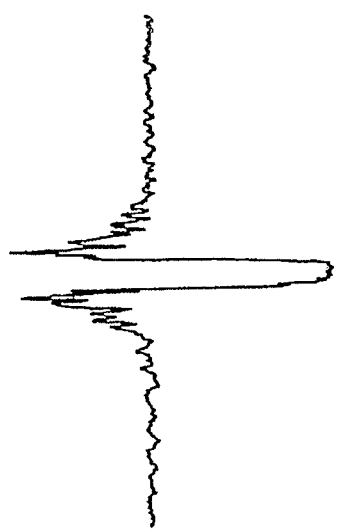
FIGS. 6*a* and 6*b* schematically show a radial deformation signal and a filtered radial deformation signal, respectively.
Figure 6B:
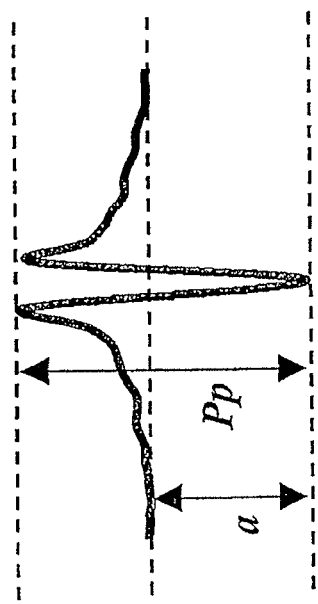

With reference to FIGS. 6(a) and 6(b), during the running of the tyre, a signal representative of the radial acceleration to which a tread area portion is generated by the radial accelerometer secured to the tyre (see FIG. 6(a)). The signal can be low-pass filtered, in order to remove high-frequency components due to interaction between the road and the tyre (see FIG. 6(b)). From the filtered signal, the amplitude Pp of the signal peak can be measured. Preferably, the peak amplitude value to be measured corresponds to the difference between the maximum signal value and the minimum signal value. Furthermore, the amplitude corresponding to the first peak can be used, or the amplitude of the second peak, or an average of the first and of the second peak.

In order to derive the rotation speed of the tyre, the average acceleration level a in a portion outside the signal variation caused by the passage of the accelerometer under the contact patch can also be measured. The radius of the tyre should also be known for the above purpose. In an alternative embodiment, the average signal value in a whole turn of the tyre could be used as a measure of the average acceleration level a. In a further alternative embodiment, using a plurality of sensor devices located within the tyre at different circumferential positions, a first sensor device located outside the contact patch could be used in order to measure the average acceleration level a (and derive the rotation speed of the tyre), in real-time, in the same time interval in which a second sensor device passes under the contact patch. Simple control electronics can be implemented within the sensor devices in order to trigger the needed measurements. The needed algorithms for the above described analysis of the signal generated by the accelerometer can also be stored within the memory of the sensor device, in order to be used by the associated processing unit.

Figure 8:
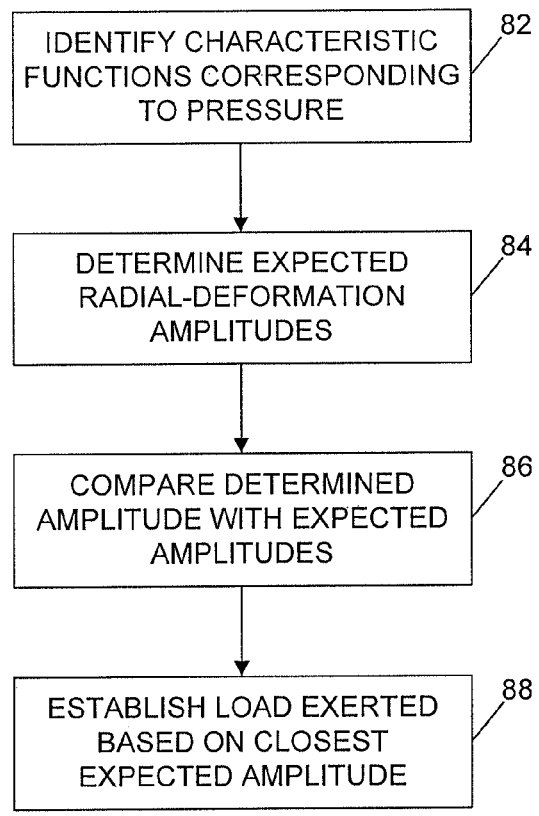
FIG. 8 is a flow chart of the steps performed in estimating a tyre load.

The pressure p is also measured during running of the tyre. By using the measured pressure p, the correct set of fit coefficients of the tyre load curves can be identified (see equations [2]), as indicated at 82 in FIG. 8. Should the measured pressure px be different from the pressure values p1, p2, ... pn used for the characterization of the tyre, a corrective factor can be applied. Let, for example, p1 be the closer stored pressure value to px, then the corrective factor may be $\gamma=px/p1$, so as the corrected fit coefficient take the following values:

pressure px: $[(a1_{q1,p1})^\gamma, (b1_{q1,p1})^\gamma, (c1_{q1,p1})^\gamma], \ldots, [an_{qn,p1})^\gamma, (bn_{qn,p1})^\gamma, (cn_{qn,p1})^\gamma]$ Then, by using the measured rotation speed $V_m$ (or $\omega_m$) and the identified fit coefficients, different expected radial deformation peak values $y\_1(\omega_m, q1, px), y\_2(\omega_m, q2, px), \ldots, y\_n(\omega_m, qn, px)$ can be determined, as indicated at 84 in FIG. 8. Such values $y\_1, y\_2, \ldots, y\_n$ are then compared with the measured peak amplitude Pp, in order to determine the closer value thereof, as indicated at 86 in FIG. 8. Such closer value identifies the closer tyre load curve, i.e. the closer tyre load to the actual load supported by the tyre. The identification of the closer tyre load curve could be enough for an estimation of the tyre load, depending on the requirements, as indicated at 88 in FIG. 8. For a more precise determination, a simple proportion can be performed in order to determine the actual tyre load. Let $y\_3(\omega_m, q3, px)$ be the closer expected peak amplitude value calculated at px and $V_m$ (or $\omega_m$), identifying the closer tyre load q3. Thus, it holds:

actual tyre load: $Pp = q3 : y\_3$ and then:

actual tyre load = $Pp \times q3/y\_3$ [3]

The above described formulas for calculation of the actual tyre load can also be stored within the memory of the sensor device, in order to be used by the associated processing unit.

EXAMPLE

Figure 7:
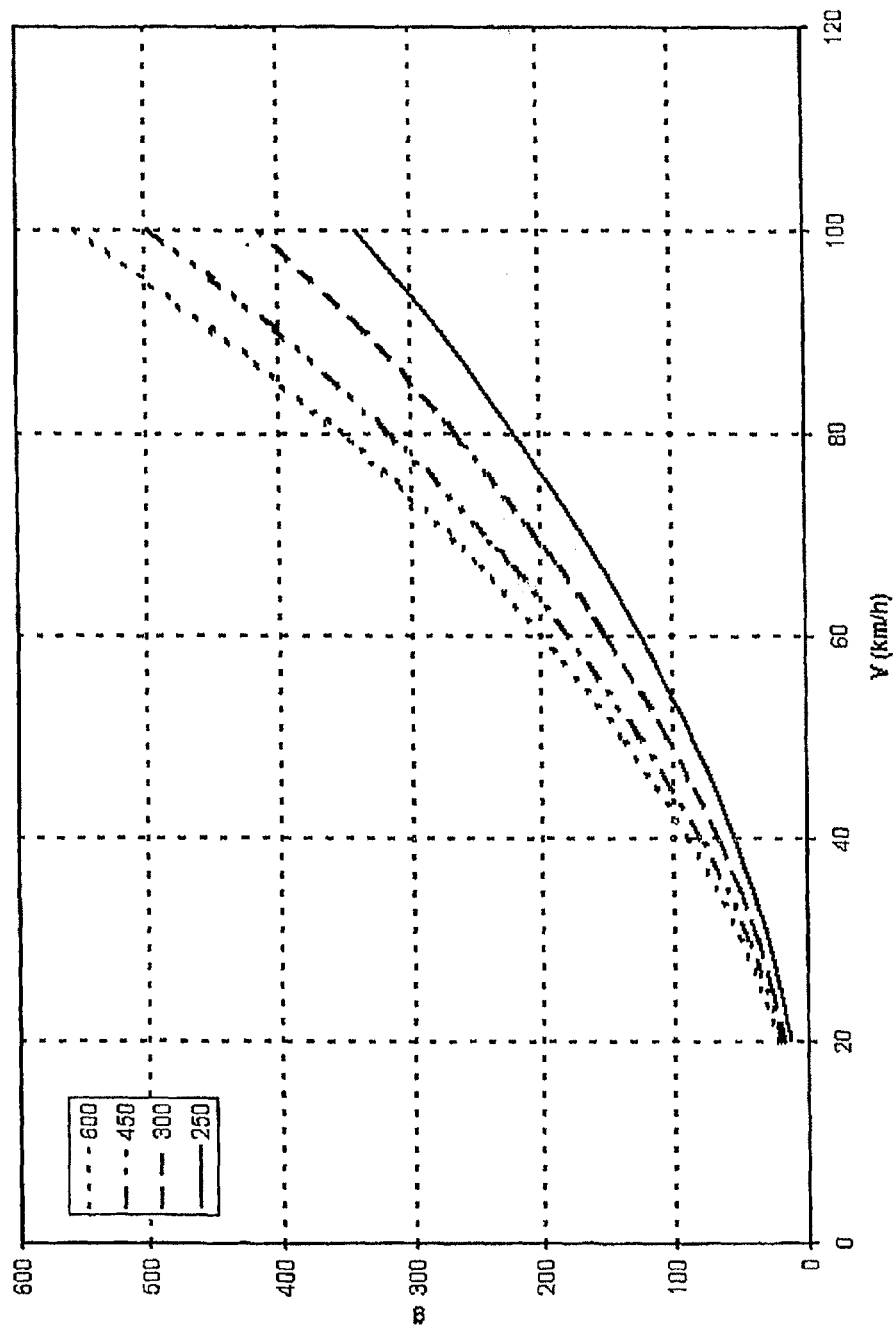
FIG. 7 shows further sets of curves of radial deformation peak amplitude versus tyre rotation speed, corresponding to different tyre loads.

The Applicant has performed a series of measurements by using a radial accelerometer secured to the inner liner of a tyre model PIRELLI® P7®, having a radius of 0.31 m. FIG. 7 shows a plot with four curves of the radial deformation peak values measured during the characterization step, versus the rotation speed of the tyre. The four curves show in FIG. 7 refer to measurements performed at an inflation pressure of 2.2 bar, and at the following tyre loads: tyre loads of 250 kg, 300 kg, 450 kg, 600 kg. As above described, higher tyre loads correspond to higher curves (i.e, to higher peak values). In particular, the four curves shown in FIG. 7 can be described by the following fit functions:

$$y\_1 = 0.034\omega^2 + 0.031\omega + 0.27 \text{ for } q1 = 250 \text{ kg}$$

$$y\_2 = 0.041\omega^2 + 0.049\omega + 0.30 \text{ for } q2 = 300 \text{ kg}$$

$$y\_3 = 0.049\omega^2 + 0.053\omega + 0.23 \text{ for } q3 = 450 \text{ kg}$$

$$y\_4 = 0.055\omega^2 + 0.030\omega + 0.29 \text{ for } q4 = 600 \text{ kg} \quad [4]$$

After the characterization, a measurement at a tyre load different from the above values was performed. From the radial acceleration signal, a radial deformation peak amplitude value of 210 g and a rotation speed of 75 km/h were derived. The inflation pressure was 2.2 bar.

By using equations [4], the following expected deformation peak amplitudes can be calculated at a rotation speed of 75 km/h: $y\_1 = 156$ g; $y\_2 = 189$ g; $y\_3 = 225$ g $y\_4 = 251$ g. Thus, the closer peak amplitude value is $y\_3$, corresponding to a tyre load of 450 kg. By using equation [3], it could be derived the actual tyre load, i.e. 420 kg.

It has to be understood that the above described method for determining the tyre load could be modified without departing from the general teachings of the invention. For example, a database comprising values of expected radial deformation peaks corresponding to predetermined tyre inflation pressures, tyre rotation speeds and tyre loads intervals can be stored within the memory of the sensor device 3, in place of the above mentioned fit coefficients. The values stored in the database could be inferred by characterization curves obtained as disclosed above. From such database, an estimation of the tyre load could be done, after having gained knowledge of the radial deformation amplitude, of the tyre rotation speed and of the tyre inflation pressure.

The real-time determination of the load acting on a tyre mounted on a vehicle is an important parameter that can be passed to a vehicle control system, in order to control the behavior of the vehicle, particularly in critical conditions. A vehicle control system may comprise a brake controller (for example, an anti-lock brake unit), and/or a steering controller, and/or a suspension controller, and/or an engine controller, and/or a transmission controller.

For example, a vehicle brake control system may adjust the braking force on each tyre according to the load on the tyre.

As another example, the loads on each tyre may be used to determine the vehicle stability envelope and to select the maximum variation allowed from steering commands. This information may be applicable to a steering control system (Electrically Assisted Steering Systems) to limit the yaw rate.

As another example, a vehicle suspension control system may adjust the stiffness of the suspension springs for each tyre according to the load on the tyre. Furthermore, a sensed unequal load distribution between left fitted tyres and right fitted tyres could be compensated by an Active Roll Control system, that currently use sensed lateral acceleration to increase the hydraulic pressure to move stabilizer bars, in order to remove a vehicle lean when cornering.

The conditions of the vehicle may indicate that the performance of the vehicle is reduced and that the driver should restrict his driving maneuvers. The vehicle control system itself can take action, for example in order to limit the maximum vehicle speed to maintain stability and not exceed the tyre specifications, or to limit steering yaw rate in order to keep rollovers from occurring. The driver may be alerted to the current vehicle control system condition and of the actions that the vehicle control system has taken on his behalf to safe the vehicle (reducing the maximum attainable speed, steering rate, engine power), as needed on a display device. On the same display device it may also be shown whether he should take further action on his own (change the distribution of mass, restrict driving maneuvers and speed). The display device may comprise a visual and/or an audible unit, for example located in the dashboard of the vehicle.

What is claimed is:

1. A system for determining a load exerted on a tyre, fitted on a vehicle, during running of the vehicle on a rolling surface, the system comprising:
   a measuring device;
   a pressure sensor;
   a device for estimating a rotation speed of the tyre; and
   at least one processing unit;
   wherein the measuring device is adapted to acquire a signal representative of a deformation to which a first tread area portion of the tyre is subjected during passage of the first tread area portion through a contact region between the tyre and the rolling surface,
   wherein the pressure sensor is adapted to sense an inflation pressure of the tyre,
   wherein the at least one processing unit is adapted to determine an amplitude of a radial deformation in a first portion of the signal, and
   wherein the at least one processing unit also is adapted to derive the load exerted on the tyre from the rotation speed, the inflation pressure, and the amplitude.

2. The system of claim 1, wherein the measuring device comprises:
   a radial accelerometer.

3. The system of claim 1, wherein the measuring device comprises:
   a sampling device;
   wherein the sampling device is adapted to sample the signal at a frequency greater than or equal to 5 kHz.

4. The system of claim 1, wherein the measuring device comprises:
   a sampling device;
   wherein the sampling device is adapted to sample the signal at a frequency greater than or equal to 7 kHz.

5. The system of claim 1, further comprising:
   a filtering device;
   wherein the filtering device is adapted for low-pass filtering the signal.

6. The system of claim 1, wherein the device for estimating the rotation speed of the tyre is the at least one processing unit.

7. The system of claim 1, further comprising:
   at least one memory;
   wherein the at least one memory is associated with the at least one processing unit.

8. The system of claim 7, wherein the at least one memory comprises:
   pre-stored characteristic functions;
   wherein the pre-stored characteristic functions describe an expected radial-deformation amplitude versus rotation speed that corresponds to predetermined conditions of load exerted on the tyre and inflation pressure.

9. The system of claim 8, wherein the pre-stored characteristic functions comprise polynomial functions.

10. The system of claim 7, wherein the at least one memory comprises pre-stored instructions for the at least one processing unit.

11. The system of claim 10, wherein the pre-stored instructions comprise at least one first set of instructions adapted to:
identify a set of characteristic functions corresponding to a sensed inflation pressure; and
determine, from the set of characteristic functions, a corresponding set of expected radial-deformation amplitudes corresponding to the estimated rotation speed.

12. The system of claim 11, wherein the pre-stored instructions comprise at least one second set of instructions adapted to:
compare the determined radial-deformation amplitude with any one of the set of expected radial-deformation amplitudes in order to identify a closest expected radial-deformation amplitude; and
establish the load exerted on the tyre based on the closest expected radial-deformation amplitude.

13. The system of claim 1, wherein the measuring device is included in a sensor device disposed in a tread area portion of the tyre.

14. The system of claim 13, wherein the sensor device is disposed near an equatorial plane of the tyre.

15. The system of claim 13, wherein the sensor device comprises the at least one processing unit.

16. The system of claim 13, wherein the sensor device is secured to an inner liner of the tyre.

17. The system of claim 16, further comprising:
a damping element between the sensor and the inner liner.

18. The system of claim 13, wherein the sensor device comprises a transmitting device.

19. The system of claim 18, wherein the transmitting device is operatively connected to a first antenna.

20. The system of claim 13, further comprising:
a fixed unit located on the vehicle;
wherein the fixed unit comprises a receiving device for receiving data from the sensor device.

21. The system of claim 20, wherein the sensor device further comprises:
a transmitting device;
wherein the transmitting device is operatively connected to a first antenna, and
wherein the receiving device comprises a second antenna.

22. The system of claim 21, wherein the first and second antennas are adapted for data transmission at a frequency greater than or equal to 400 MHz and less than or equal to 450 MHz.

23. The system of claim 13, wherein the sensor device further comprises a power source.

24. The system of claim 23, wherein the power source comprises a battery.

25. The system of claim 23, wherein the power source comprises:
a self-powering device;
wherein the self-powering device is adapted to generate electrical power as a result of mechanical stresses undergone by the sensor device during the running of the vehicle.

26. The system of claim 25, wherein the self-powering device comprises a piezoelectric element.

27. The system of claim 25, wherein the self-powering device comprises an electrical storage circuit.

28. The system of claim 27, wherein the electrical storage circuit comprises:
a resistor; and
a capacitor.

* * * * *